United States Patent [19]
Yamada et al.

[11] 3,994,577
[45] Nov. 30, 1976

[54] CARTRIDGE FOR AUDIO-VISUAL PROJECTORS

[75] Inventors: Kimitika Yamada; Kiyoyuki Arai, both of Tokyo, Japan

[73] Assignee: Copal Company Limited, Japan

[22] Filed: Feb. 24, 1975

[21] Appl. No.: 552,565

[30] Foreign Application Priority Data
Feb. 25, 1974 Japan .......................... 49-22590[U]
Feb. 28, 1974 Japan .......................... 49-24379[U]

[52] U.S. Cl. ................................ 352/128; 352/72; 242/55.19 A
[51] Int. Cl.² ........................................ G03B 21/00
[58] Field of Search ............ 352/72, 78 R, 128, 159; 242/55.19 A; 226/76

[56] References Cited
UNITED STATES PATENTS

| 3,244,470 | 4/1966 | Hennessey | 242/55.19 A |
| 3,271,096 | 9/1966 | Blackmore | 352/72 |
| 3,350,025 | 10/1967 | Lear | 242/55.19 A |
| 3,464,765 | 9/1969 | Broeckl | 352/72 |
| 3,871,754 | 3/1975 | Procop | 352/72 |

*Primary Examiner*—Monroe H. Hayes
*Attorney, Agent, or Firm*—Cushman, Darby & Cushman

[57] ABSTRACT

A film cartridge for audio-visual projectors comprising a concavity portion provided in a part of a side wall thereof and capable of cooperating with a sprocket means provided on a projector body to run the endless film in the cartridge, and a groove formed in a part of a peripheral edge thereof to contain a film loop to be formed by a loop setting means provided in the projector body, thereby to simplify the entire structure of the film cartridge.

3 Claims, 6 Drawing Figures

CARTRIDGE FOR AUDIO-VISUAL PROJECTORS

BACKGROUND OF THE INVENTION a. Field of the invention

The present invention relates to film cartridges and, more particularly, to improvements in a film cartridge for audio-visual projectors.

b. Description of the prior art

In a conventional type of film cartridge for projectors wherein a sprocket means is used to run a film contained in the cartridge, the sprocket means is mostly built in the cartridge. However, in such type of cartridge, there have been defects that the internal structure is so complicated as to be likely to be expensive and that, whenever the sprocket means is out of order, the cartridge will have to be disassembled.

SUMMARY OF THE INVENTION

Therefore, a primary object of the present invention is to provide a film cartridge of a type formed so that, when the cartridge is mounted in a determined position on a projector body, a sprocket means provided in the projector body may positively engage with perforations of a film portion exposed in a side wall part of the cartridge and containing no sprocket means.

Another object of the present invention is to provide a film cartridge for audio-visual projectors simplified in the structure, low in the price and having excellent performances.

A still another object of the present invention is to provide a film cartridge for audio-visual projectors formed so that, when the cartridge is mounted in a determined position on a projector body, a film loop may be automatically formed within the cartridge.

These and other objects of the present invention will become more apparent during the course of the following detailed description and appended claims.

DESCRIPTION OF THE PREFERRED EMBODIMENT

Figure 1:
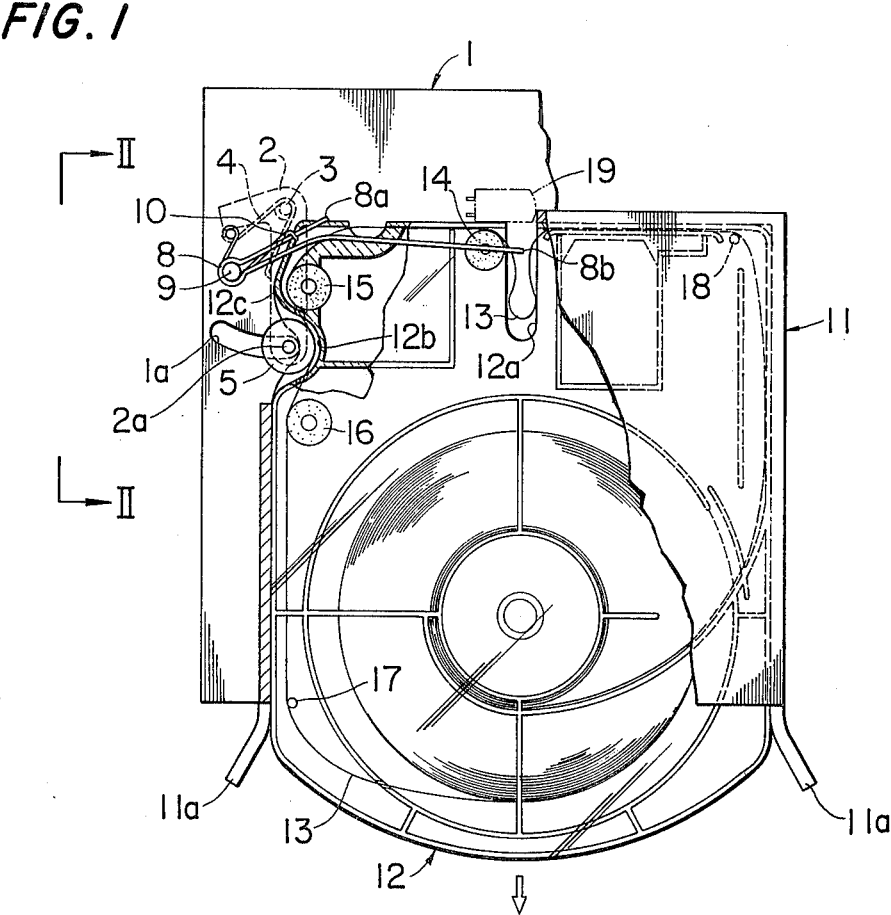
FIG. 1 is a plan view showing a film cartridge according to the present invention as mounted on a projector body together with related means provided on the projector body.
Figure 2:
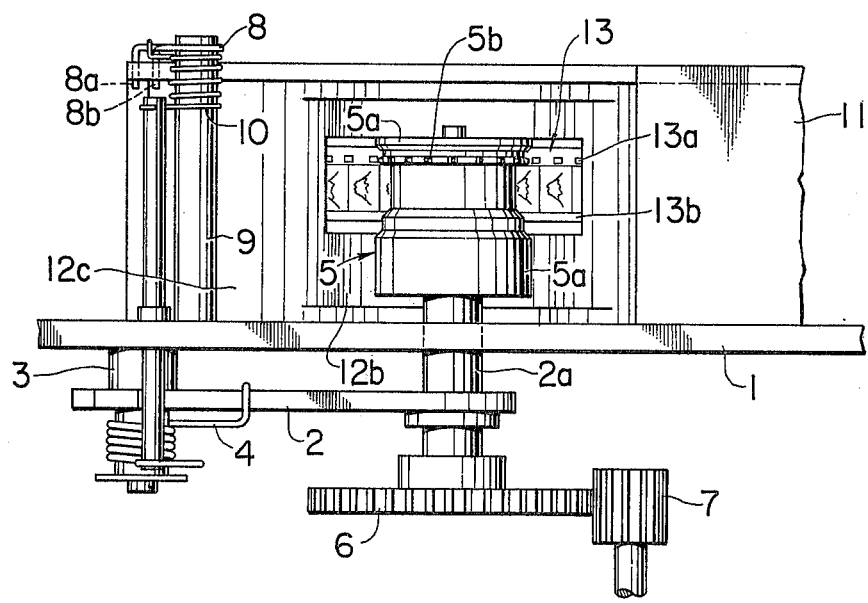
FIG. 2 is a magnified side view as seen on line II—II in FIG.1.

Referring to FIGS. 1 and 2, numeral referance 1 designates a base plate of a projector having an arcuate slot 1a. Numeral 2 designates a lever rotatably supported by a shaft 3 fixed on the lower surface of the base plate 1 and rotatably supporting a shaft 2a extending upward through the arcuate slot 1a at one arm end. Numeral 4 designates a spring biasing the lever 2 counter-clockwise in FIG. 1. Numeral 5 designates a sprocket secured to the upper end of the shaft 2a and having column parts 5a and sprocket teeth 5b. Numeral 6 designates a gear secured to the lower end of the shaft 2a. Numeral 7 (FIG. 2) designates a driving gear engageable with the gear 6. Numeral 8 designates a loop setting member consisting of a hard wire or the like rotatably fitted to the top part of a pillar 9 fixed on the base plate 1 and bent downward at both tips as clearly shown in FIG. 2. Numeral 10 designates a spring biasing the loop setting member 8 clockwise in FIG. 1.

Numeral 11 designates a box for receiving a later described film cartridge 12 formed integrally with the base plate 1 on said base plate 1, having guide parts 11a and having at least the side wall part opposed to the sprocket 5 cut off. The film cartridge 12 is so formed as to be able to be entirely smoothly inserted into the the box 11 and comprises an upper wall made of a transparent synthetic resin having a U-shaped notch or groove 12a which can receive a bent part 8b at the tip of the loop setting member 8, and a side wall having a concavity part 12b capable of receiving the sprocket 5 and a cam part 12c continued to said concavity part 12b. Numeral 13 designates a tape-shaped projection film contained as endless in the cartridge 12 and so regulates as to run mostly along the peripheral wall of the cartridge 12 by a plurality of guide rollers 14, 15 and 16 rotatably supported within said cartridge 12 and guide pins 17 and 18. As apparent from FIG. 2, the film 13 is provided with perforations 13a engageable with the sprocket teeth on one side of an image and a sound recording band 13b on the other side and is exposed to the outside in the parts of the groove 12a and concavity part 12b of the cartridge 12.

FIGS. 1 and 2 show the film cartridge 12 as fitted in a determined position of the projector body, that is, in the box 11. In this state, the sprocket 5 will be in the concavity part 12b formed in the side wall of the cartridge 12, the sprocket teeth 5b will engage with the perforations 13a of the film 13, a proper film loop will be formed in the groove 12a formed in the cartridge 12 and the loop setting member 8 will be pushed by the side wall of the cartridge 12 to be rotated counter-clockwise in FIG. 1 against the spring 10 in one bent part 8a and will be therefore held in no contact with the film 13 within the groove 12a in the other bent part 8b. Further, in this state, the gear 6 will be engaged with the driving gear 7 as shown in FIG. 2. Therefore, if the driving gear 7 is rotated by a driving source device not illustrated, the sprocket 5 will be also rotated through the gear 6 and the film 13 contained in the cartridge 12 will be run as endless along a determined course by the guide pin 18, guide rollers 14, 15 and 16 and guide pin 17.

The operations of pulling the film cartridge 12 out of the box 11 and inserting it into the box shall be explained in the following. When the film cartridge 12 is pulled in the direction indicated by the arrow out of the position in FIG. 1, following this motion, first of all, the loop setting member 8 will be rotated clockwise until it comes into contact with a stopper not illustrated around the pillar 9 by the spring 10. On the other hand, the sprocket 5 will be pushed up in the column parts 5a by the cam surface of the cam part 12a formed in the side wall part of the cartridge 12 and will be therefore made to escape out of the concavity part 12b while rotating the lever 2 clockwise around the shaft 3 against the spring 4. In such case, the sprocket teeth 5b will disengage from the perforations 13a of the film 13 and the gear 6 will disengage from the driving gear 7. Therefore, the film 13 will stop running and the sprocket 5 will escape out of the concavity part 12b while rolling. As apparent from this explanation, even while the projector is in the operating state, that is, the driving gear 7 is rotating, the cartridge 12 will be able to be pulled out of the box 11 and force for pulling it out may be small. Thus, when the cartridge 12 has been completely pulled out of the box 11, the lever 2 and sprocket 5 will return to be held in the respective positions in FIG. 1.

Figure 4A:
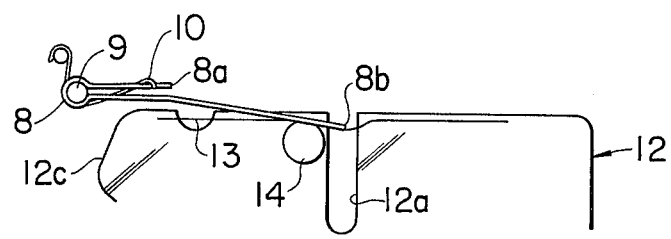
FIGS. 4a to 4c are explanatory partial plan views showing respectively steps of forming a film loop within a film cartridge according to the present invention while said film cartridge is being mounted on a projector.
Figure 4B:
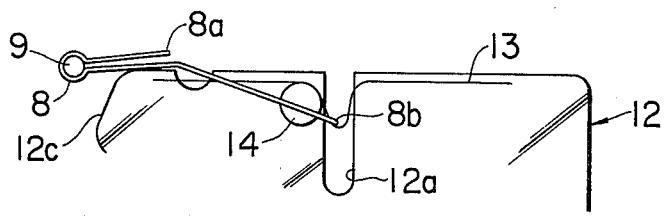
Figure 4C:
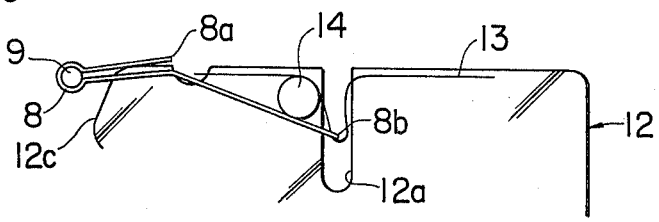

Next, when the cartridge 12 is pushed in the direction reverse to that indicated by the arrow in FIG. 1, first of all, the bent part 8b formed at the tip of the loop setting member 8 will advance into the groove 12a of the cartridge 12 and will engage with the part of the film 13 exposed across the groove 12a (See FIG. 4a). In such case, the loop setting member 8 resiliently pressed by the spring 10 will remain in the position. Therefore, as the cartridge 12 is inserted deeper into the box 11, the film 13 will be pulled out into the groove 12a (See FIGS. 4b and 4c) and thus, when the cartridge 12 has been completely inserted into the box 11, a fixed film loop will be automatically formed in the groove 12a as a result.

Figure 3:
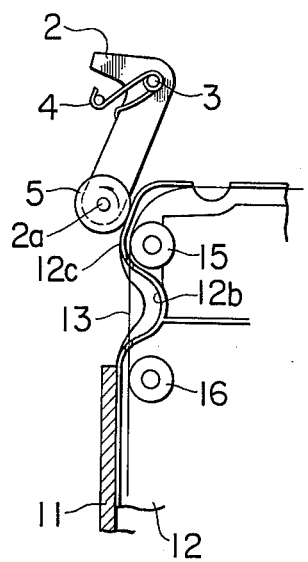
FIG. 3 is an explanatory partial plan view showing a film cartridge according to the present invention as being mounted on a projector body.

On the other hand, the column part 5a of the sprocket 5 will come into contact with the cam part 12c formed in the side wall of the cartridge 12 some time later than the beginning of the formation of such film loop as is mentioned above and, with the insertion of the cartridge 12 thereafter, the lever 2 will be rotated clockwise from the position in FIG. 1 against the resiliency of the spring 4 (See FIG. 3). Thus, as the cartridge 12 is inserted deeper into the box 11, the sprocket 5 will be led into the concavity part 12b while rolling on the cam surface of the above mentioned cam part 12c. In such case, as the diameter of the column parts 5a of the sprocket 5 is so designed in advance as to be somewhat larger than the diameter of the addendum circle of the sprocket teeth 5b, the sprocket 5 will roll smoothly without damaging the cam surface of the cam part 12c. Thus, as the sprocket 5 advances into the concavity part 12b formed in the side wall of the cartridge 12, the lever 2 will be again rotated counter-clockwise around the shaft 3 by the spring 4 and the sprocket teeth 5b will approach the perforations 13a in the part of the film 13 exposed across the above mentioned concavity part 12b and will fit into the perforations 13a located in the corresponding positions. However, even when the sprocket teeth 5b do not engage with the perforations 13a simultaneously with coming into contact with the film surface, sprocket 5 itself will be still rolling in contact with the cam part 12c and therefore the film 13 will be moved more or less by the rotation of the sprocket 5 so as to engage with the next coming perforations 13a. In such case, as the film 13 itself is elastic, the perforations 13a will not be broken. Thus, when the cartridge 12 has been completely inserted into the box 11, the sprocket 5 will also fit in the proper position within the concavity part 12b, the gear 6 will engage with the driving gear 7 and the film 13 will begin to run. In this stage, the film loop will have been already formed and the loop setting member 8 will be pushed up in the bent part 8a by the side wall of the cartridge 12 and will therefore occupy the position in FIG. 1.

By the way, as shown with chain lines in FIG. 1, a microswitch 19 is set in the track of the bent part 8b at the tip of the loop setting member 8 on the base plate 1 so that, in case the film loop in the groove 12a becomes extraordinarily small for any reason, the microswitch 19 may be operated by the counter-clockwise rotation of the loop setting member 8 due to the tension of the film 13 to open an energizing circuit for a driving device not illustrated and to prevent the perforations 13a from being broken by the sprocket teeth 5b.

As described above, when the film cartridge according to the present invention is used, not only the various defects of the conventional film cartridge of the build-in sprocket type will be able to be all eliminated but also the cartridge will be able to be very smoothly and positively fitted in a determined position on the projector body and a fixed film loop will be able to be automatically formed and the endless film contained in the cartridge will be able to be automatically run simultaneously with the fitting of the cartridge.

We claim:

1. The audio-visual film cartridge projection system, comprising:

a film cartridge, including:

a box having opposite faces joined by an outer peripheral wall;

an endless loop of film received within the box, said film having a series of sprocket holes running therealong adjacent at least one margin thereof;

guide means mounted within the box for mounting the loop of film and for guiding the loop of film for travel along a path including a segment wherein the loop of film progresses along the inside of said outer peripheral wall;

said box including means defining a concavity in said outer peripheral wall intermediate said path segment;

said box further including means defining a notch in said outer peripheral wall intermediate said path segment, but spaced therealong from said concavity;

means defining first opening means through said outer peripheral wall at said concavity and means defining a second opening means through said outer peripheral wall at said notch;

said film being accessable from the exterior of said box through said first and second opening means;

said outer peripheral wall further including means defining a cam surface arranged to engage a projector drive sprocket as the cartridge is being inserted into and withdrawn from a projector, for the purpose of facilitating meshing and disengagement of the drive sprocket with the series of sprocket holes in the film where the film is accessible through said first opening means;

the box further including a stop surface for a loop setting member of the projector;

the stop surface being so disposed on the box, relative to the notch, the concavity and the cam surface, that when the cartridge is being inserted in the projector, the following succession of events occurs:

a. the loop setting member engages the film through said second opening means and pushes the film inwardly creating a U-shaped loop in said notch and then is withdrawn from engagement with the film by engagement with said stop surface; and b. the sprocket engages the cam surface and is kept clear of the film by the cam surface only until the cartridge is sufficiently fully inserted in the projector that the sprocket is stationed to engage the film where the film is accessible through the first opening means within the concavity, whereupon the sprocket clears the cam surface and drivingly engages in the series of sprocket hole.

2. An audio-visual film cartridge projection system, comprising:

a projector including:

a body having a base plate provided with guide parts for removably accepting a film cartridge of the following sort:

one in which an endless loop of film with a series of sprocket holes along one margin is housed in a box having a notch and a concavity in its outer peripheral surface and in which concavity and notch the film is exposed, through respective first and second opening means and which box has a stop surface associated with the notch and a cam surface associated with the concavity;

said projector further including:

a film drive sprocket, means mounting said sprocket for rotation on the base plate, this mounting means including means permitting limited translation of the sprocket and means biasing the sprocket in one translational direction;

a resiliently mounted loop setting member including one part arranged to engage the film in the notch of the cartridge when the cartridge is being installed in the projector and to push the film into a U-shaped loop within the notch, and a second part arranged to engage the stop surface on the box once the U-shaped loop has been formed and to resiliently deflect the first part of the loop setting member back away from the U-shaped loop;

the sprocket being so disposed on the base plate, relative to the loop setting member, that when a cartridge of said sort is being inserted in the projector, the following sequence of events occurs:

a. the first part of the loop setting member engages the film through said notch and pushes the film inwardly creating said U-shaped loop and said second part of the loop setting member engages the stop surface on the box and withdraws the first part of the loop setting member from the U-shaped loop, and b. the sprocket engages the cam surface and is kept clear of the film by the cam surface only until the cartridge is sufficiently fully inserted in the projector that the sprocket is stationed to engage the film where the film is accessible through the first opening means within the concavity, whereupon the sprocket clears the cam surface and drivingly engages in the series of sprocket holes.

3. An audio-visual film cartridge projection system of claim 2, further comprising:

a film cartridge, including:

a box having opposite faces joined by an outer peripheral wall;

an endless loop of film received within the box, said film having a series of sprocket holes running therealong adjacent at least one margin thereof;

guide means mounted within the box for mounting the loop of film and for guiding the loop of film for travel along a path including a segment wherein the loop of film progresses along the inside of said outer peripheral wall;

said box means defining a concavity in said outer peripheral wall intermediate said path segment;

said box further including means defining a notch in said outer peripheral wall intermediate said path segment, but spaced therealong from said concavity;

means defining first opening means through said outer peripheral wall at said concavity and means defining a second opening means through said outer peripheral wall at said notch;

said film being accessible from the exterior of said box through said first and second opening means;

said outer peripheral wall further including means defining a cam surface arranged to engage a projector drive sprocket as the cartridge is being inserted into and withdrawn from a projector, for the purpose of facilitating meshing and disengagement of the drive sprocket with the series of sprocket holes in the film where the film is accessible through said first opening means;

the box further including a stop surface for a loop setting member of the projector;

the stop surface being so disposed on the box, relative to the notch, the concavity and the cam surface, that when the cartridge is being inserted in the projector, the following succession of events occurs:

a. the loop setting member engages the film through said second opening means and pushes the film inwardly creating a U-shaped loop in said notch and then is withdrawn from engagement with the film by engagement with said stop surface; and b. the sprocket engages the cam surface and is kept clear of the film by the cam surface only until the cartridge is sufficiently fully inserted in the projector that the sprocket is stationed to engage the film where the film is accessible through the first opening means within the concavity, whereupon the sprocket clears the cam surface and drivingly engages in the series of sprocket holes.

* * * * *